United States Patent [19]

Arai

[11] Patent Number: 5,241,646
[45] Date of Patent: Aug. 31, 1993

[54] SYSTEMS FOR CHANGING HARDWARE PARAMETERS USING SUB-CPU FOR SENSING SPECIALIZED KEY INPUTS AND MAIN CPU FOR CHANGES

[75] Inventor: Makoto Arai, Fussa, Japan

[73] Assignee: Kabushiki Kaisha Toshiba, Kawasaki, Japan

[21] Appl. No.: 857,124

[22] Filed: Mar. 25, 1992

Related U.S. Application Data

[63] Continuation of Ser. No. 329,708, Mar. 28, 1989, abandoned.

[30] Foreign Application Priority Data

Mar. 30, 1988 [JP] Japan .................. 63-74539

[51] Int. Cl.$^5$ .................................. G06F 3/023
[52] U.S. Cl. ............................. 395/500; 395/275; 364/234; 364/234.2; 364/DIG. 1; 364/709.15
[58] Field of Search ................ 395/500, 275; 364/209, 364/709

[56] References Cited

U.S. PATENT DOCUMENTS

| 4,038,642 | 7/1977 | Bouknecht et al. | 364/900 |
|---|---|---|---|
| 4,200,913 | 4/1980 | Kuhar et al. | 364/200 |
| 4,377,852 | 3/1983 | Thompson | 364/900 |
| 4,425,627 | 1/1984 | Elbner | 364/900 |
| 4,527,250 | 7/1985 | Galdun et al. | 364/900 |
| 4,803,613 | 2/1989 | Kametani et al. | 364/200 |
| 4,823,311 | 4/1989 | Hunter et al. | 364/900 |
| 4,862,350 | 10/1989 | Orr et al. | 364/200 |
| 4,964,075 | 10/1990 | Shaver et al. | 395/275 |
| 5,086,503 | 2/1992 | Chung et al. | 395/700 |

OTHER PUBLICATIONS

Motorola Inc., Motorola Microprocessors, Series C, 1983, Austin Texas, pp. 3-494 through 3-523.

Primary Examiner—Robert B. Harrell
Assistant Examiner—William M. Treat
Attorney, Agent, or Firm—Finnegan, Henderson, Farabow, Garrett & Dunner

[57] ABSTRACT

A register is provided for storing a key selection data indicating which key is depressed. A keyboard controller sets the key selection data to the register in response to the depression of the key. A timer interrupts a CPU at a predetermined interval. Each time being interrupted, the CPU refers the register to recognize which key is depressed and and performs switching of a hardware status if the key selection data indicates that a key assigned to switch the hardware status is depressed.

3 Claims, 2 Drawing Sheets

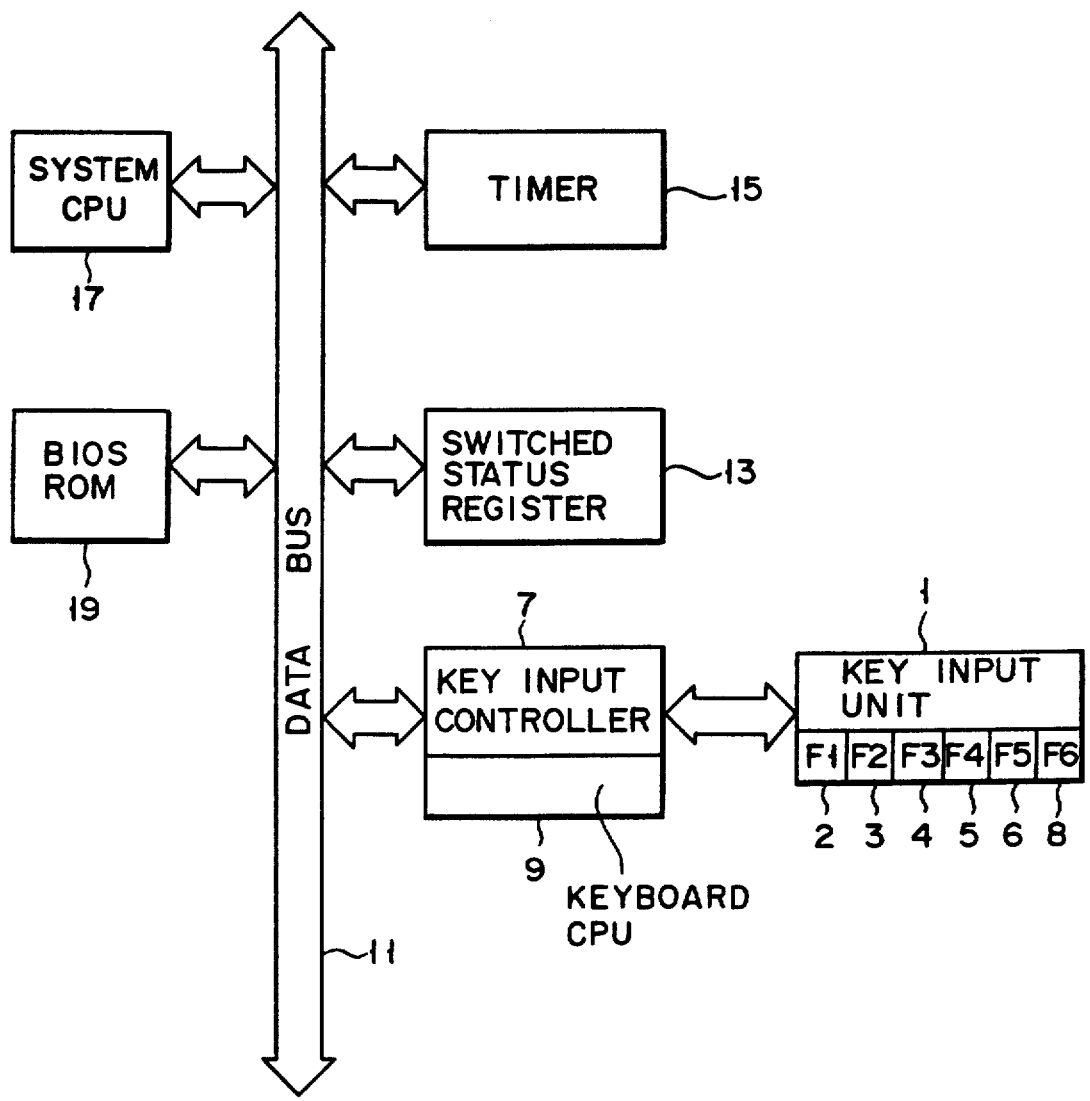
F I G. 1

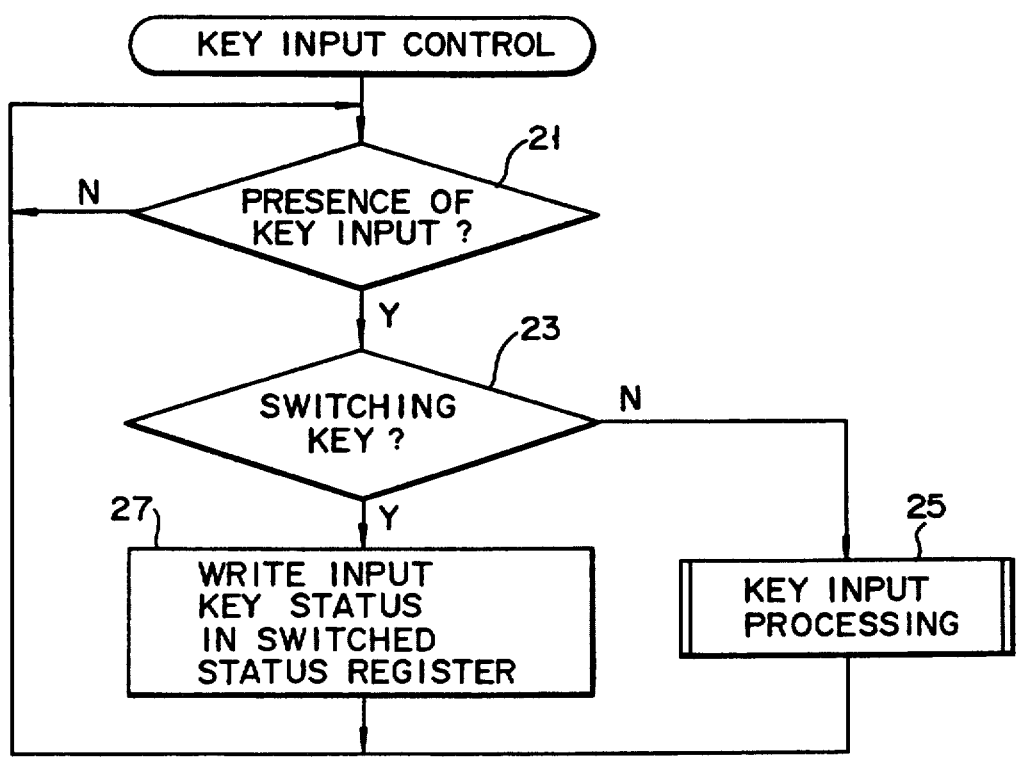
F I G. 2
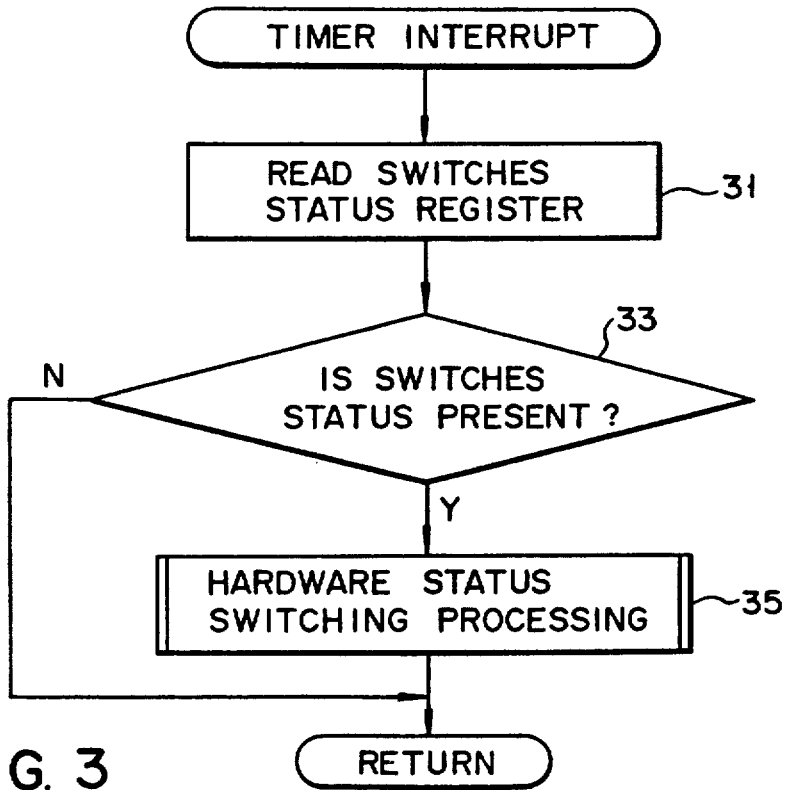
F I G. 3

SYSTEMS FOR CHANGING HARDWARE PARAMETERS USING SUB-CPU FOR SENSING SPECIALIZED KEY INPUTS AND MAIN CPU FOR CHANGES

This application is a continuation of application Ser. No. 07/329,708, filed Mar. 28, 1989, now abandoned.

BACKGROUND OF THE INVENTION

1. Field of the Invention

The present invention relates to a key input control system, and more particularly to a hardware status switching control system for switching a hardware status at an arbitrary time, by using a function key.

2. Description of the Related Art

The rapid development of semiconductor technology has produced highly-integrated and high-speed central processing units or CPUs of 16 and 32 bits, for example. Along with the development of these CPU, various personal computers have been developed.

Such a personal computer may be required to switch its hardware status. For example, a CPU clock must be changed. More specifically, when an application to be executed must be processed at high speed such as a single user multitask or a multiuser multitask, the CPU clock must be higher. On the contrary, when a game program for example is executed at the same speed as that of the multitask, an operator cannot play correctly. In this case, the CPU clock must be changed to a low speed in response to an operator's request.

Further, a personal computer which is provided with a flat panel (plasma display or a liquid crystal display) as a standard and which is connectable to a CRT display as an option is required to change the displays depending on an application program to be executed. When the application program uses the CRT display, the computer must change the flat panel display to the CRT display and vice versa.

Further, when a computer is provided with a single font and a double font as a character type to be displayed (printed), the font to be used must be selected.

The hardware status described above may preferably be switched under an operating system program (OS) or an application program being executed.

The above switching has been executed in two conventional methods.

The first method uses a keyboard interrupt. More specifically, in response to a specified function key, a keyboard CPU (a sub CPU) incorporated into a keyboard unit interrupts a main CPU. In response to the interrupt, the main CPU executes a keyboard interrupt routine, determines which key is depressed, and executes a processing corresponding to the depressed key.

However, this method has two drawbacks. First, in most cases, an application program itself performs the keyboard interrupt control. If this is case, the interrupt control included the BIOS (basic input/output system) cannot be executed. Accordingly, a switching control routine included in the BIOS cannot be executed. Second, the switching control is performed by depressing a function key. However, when the function key is assigned to a specific use in the application program, the switching control cannot be performed.

The second method uses a timer interrupt. A main CPU is interrupted at a predetermined period by a time out signal from the timer. In response to the interrupt, the main CPU inquires of a sub CPU incorporated in a keyboard if a predetermined function key is depressed. If the predetermined function key is depressed, a predetermined processing (switching control) assigned to the function key is executed by a basic input and output program (BIOS).

However, the main CPU operates asynchronously with the sub, CPU. Thus, when the main CPU performs the inquire operation, the sub CPU cannot respond to the inquiry promptly and the main CPU, generally, must wait several hundred microseconds for a response. Such delay may cause the main CPU to operate inefficiently or erroneously. For example, assume that the main CPU has been executing a communication program before being interrupted. In a high-speed communication, one character is transmitted at an interval of 100-200 microseconds. Accordingly, the main CPU fails to receive the transmitted character.

SUMMARY OF THE INVENTION

An object of the present invention is to provide a key input control system which can eliminate the wait time and prevent an erroneous operation of the main CPU when a specific key is detected by using a timer interrupt.

In order to achieve the above object, a key input control system according to the present invention, comprises: keyboard means provided with at least one key assigned to a specific function, for outputting key selection data; storage means for storing the key selection data output from said keyboard means; timer means for outputting an interrupt signal at a predetermined interval; and central processing unit means for, in response to the interrupt signal from said timer means, referring the key selection data stored in said storage means, recognizing which key is depressed, and performing a processing corresponding to a function assigned to the key.

According to the present invention, a switching status register is provided. When a specific function key is depressed for switching the hardware status, the sub CPU detects the function key and stores the key selection data in the switching status register through a data bus. Upon receiving an interrupt signal from a timer, the main CPU refers the switching status register to recognize that a function key is depressed (or which function key is depressed) without inquiring of the sub CPU. Accordingly, the wait time described above can be eliminated and the interrupted program may cause no erroneous operation.

BRIEF DESCRIPTION OF THE DRAWINGS

Other objects and features of the present invention will be apparent from the following description taken in conjunction with the following drawings in which:

FIG. 1 is a block diagram showing an embodiment of the present invention;

FIG. 2 is a flowchart showing an operation of a key input control of the embodiment shown in FIG. 1; and FIG. 3 is a flowchart showing an operation of a timer interrupt control of the embodiment shown in FIG. 1.

DETAILED DESCRIPTION OF THE PREFERRED EMBODIMENT

FIG. 1 is a block diagram showing an embodiment of the present invention. A key input unit 1 is provided with function keys 2, 3, 4, 5, 6, and 8 which are assigned to switch hardware statuses, respectively. The key input unit 1 is connected to a key input controller 7. The key input controller 7 incorporates a keyboard central processing unit or keyboard CPU 9 (sub CPU), and detects which key is depressed in response to a key depressed signal from the key input unit 1, and load a key selection signal in a switched status register 13 through a data bus 11. The switched status register 13 holds status data of the input key. In this embodiment, register 13 holds data indicating whether a function key is depressed or not and data indicating which key is depressed. The register 13 may hold only the data indicating that a key is depressed, and a basic input/output system or BIOS to be described later may detect which key is depressed. A timer 15 outputs a time out signal at a predetermined interval, and supplies it to the system (or main central processing unit (CPU) 17 through a data bus 11. The CPU 17 controls input and output units connected to the data bus 11. The BIOS ROM 19 stores a basic control program of the input and output units in a read only memory. The sub CPU 9 operates asynchronous with the main CPU 17.

An operation of the embodiment described above will now be described with reference to the flowcharts shown in FIGS. 2 and 3.

FIG. 2 is a flowchart showing the key input control. The sub CPU 9 incorporated in the key input controller 7 determines in step 21 if a key is input. If no key is input, the CPU 9 waits in step 21 until a key is input. Upon determining in step 21 that a key is input, the CPU 9 determines in step 23 if the input key is a specific function key assigned to change a hardware status. If the input key is not the specific function key, the CPU 9 performs a key input processing operation for other keys in step 25. Since the key input processing of step 25 is not directly related to the present invention, and therefore a description thereof is omitted.

On the contrary, if a function for switching a hardware status is determined to be depressed in step 23, the CPU 9 loads key input status data indicating which function key is depressed, in the switched status register 13.

FIG. 3 is a flowchart showing an operation of the main CPU 17. As described above, the timer 15 interrupts the main CPU 17. In response to the interrupt, the CPU 17 reads, in step 31, the key input status stored in the switched status register 13. In step 33, the CPU 17 determines from the key input status data if a function key indicating a switching of a hardware status is depressed. If the function key indicating the switching of the hardware status is not depressed, the CPU 17 executes a timer interrupt processing operation.

On the contrary, if the function key indicating the switching of the hardware status is depressed, the CPU 17 executes a hardware status switching operation in step 35. More specifically, if a function key to switch a CPU clock is depressed, the CPU 17 changes the CPU clock. If a function key indicating a switching among the CRT display, the plasma display, and the liquid crystal display is depressed, the CPU 17 changes the display. If a function key indicating a switching of a display resolution (640×400, 640×350 and the like) of the plasma display is depressed, the CPU 17 changes the display resolution. Furthermore, if a function key indicating a switching between the single font and the double font, the CPU 17 changes the font. Thereafter, the CPU 17 clears the contents of the switched status register 13.

Note that in the above embodiment, a control has been described of promptly determining if a function key is depressed by exemplifying a switching of hardware statuses, but the present invention is not limited to the above embodiment.

For example, a key to be detected may be any key other than the function keys. Furthermore, any function may be assigned to any key.

What is claimed is:

1. A key input control system in a data processing system capable of performing a plurality of predetermined functions, including switching a hardware status, the key input control system comprising:

means for communicating data;
 keyboard means for selecting a predetermined function, including a plurality of keys which are assigned to the plurality of predetermined functions;
 sub central processing unit (CPU) means, connected between said communicating means and said keyboard means, for sensing depression of a key, for determining whether the depressed key is assigned a function of changing a hardware status of the data processing system, and for outputting key designation data identifying said depressed key;
 register storage means for receiving data, via said communicating means, and storing data, including said key designation data corresponding to said depressed key;
 timer means, connected to said communicating means, for outputting an interrupt signal at a predetermined time interval; and
 main central processing unit (CPU) means for reading, via said communicating means and in response to said interrupt signal from said timer means received via said communicating means, the contents of said register storage means, for determining whether the contents of said register storage means is data identifying the selected key and for performing, if the contents of the register storage means is data identifying the selected key, a function of changing a hardware status of the data processing system assigned to the depressed key.

2. The system according to claim 1, wherein the plurality of hardware statuses includes a plurality of clock rate statuses of same main CPU means, a plurality of display statuses including a CRT display status and a flat panel display status, and a single font status and a double font status.

3. A key input control method in a data processing system including a main central processing unit, a timer, a status register for storing status data, a keyboard having a plurality of keys, wherein a key is permanently assigned one of a plurality of functions to be performed by said data processing system, and wherein a sub central processing unit is coupled between the keyboard and the central processing unit, and wherein the data processing system further includes a communicating means coupled between said main central processing unit, said timer, said status register, and said sub central processing unit, the method including the following steps:

determining, in the sub central processing unit, whether one of the plurality of keys on said keyboard has been depressed thereby initiating a key designation signal indicating selection of the key;
 receiving from said keyboard the key designation signal indicating selection of the key;
 determining, in the sub central processing unit, whether the key designation signal corresponding to the selected key indicates that the selected key is assigned a function of changing a hardware status of the data processing system;

storing, when the selected key is assigned the function of changing a hardware status of the data processing system, data identifying the selected key in the status register received via said communicating means from said sub central processing unit;

supplying, via said communicating means, timer interrupt signals from said timer to the main central processing unit at predetermined time intervals;

reading, in the main central processing unit and via said communicating means in response to the supplying of a timer interrupt signal, the contents of the status register;

determining, in the main central processing unit, whether the contents of the status register is data identifying the selected key; and performing, if the contents of the status register is data identifying the selected key, the function of changing a hardware status of the data processing system assigned to the selected key.

* * * * *

UNITED STATES PATENT AND TRADEMARK OFFICE
CERTIFICATE OF CORRECTION

PATENT NO. : 5,241,646
DATED : August 31, 1993
INVENTOR(S) : Makoto ARAI

It is certified that error appears in the above-indentified patent and that said Letters Patent is hereby corrected as shown below:

Abstract, Front Page, line 7, delete "and" (second occurrence).

Claim 1, column 4, line 28, before "outputting" insert --repeatedly--.

Claim 2, column 4, line 43, change "same" to --said--.

Claim 3, column 5, line 9, before "supplying" insert --repeatedly--.

Signed and Sealed this

Fourth Day of October, 1994

Attest:

BRUCE LEHMAN

*Attesting Officer*    *Commissioner of Patents and Trademarks*